United States Patent Office 3,087,953
Patented Apr. 30, 1963

---

3,087,953
PROCESS FOR THE EXCHANGE OF HYDROCARBON GROUPS BETWEEN ALUMINIUM AND BORON HYDROCARBON COMPOUNDS
Roland Köster, Mulheim (Ruhr), Germany, assignor to Studiengesellschaft Kohle m.b.H., Mulheim (Ruhr), Germany, a body corporate of Germany
No Drawing. Filed Jan. 19, 1959, Ser. No. 787,337
Claims priority, application Germany Jan. 22, 1958
16 Claims. (Cl. 260—448)

This invention relates to a process for the exchange of hydrocarbon groups between aluminium and boron hydrocarbon compounds.

It has been found that the hydrocarbon groups of aluminium and boron hydrocarbon compounds can be exchanged if a boron hydrocarbon compound is reacted with an aluminium hydrocarbon compound having different hydrocarbon radicals. For the production of low boron hydrocarbons according to the invention, higher boron hydrocarbons are reacted with aluminium hydrocarbons the hydrocarbon radicals of which have a lower molecular weight than those of the boron compound employed, and the mixture is distilled. For the production of higher boron hydrocarbons, low boron hydrocarbons are reacted in the cold with an excess of aluminium hydrocarbons the hydrocarbon radicals of which have a higher molecular weight than those of the boron compound used, and the mixture is hydrolyzed, advantageously with water. The interchange of the hydrocarbon radicals in accordance with the invention can in principle be continued until equilibrium is reached.

If for example boron tributyl and aluminium triethyl are mixed with one another and the mixture thereof is distilled, two fractions are obtained very smoothly, the first consisting of boron triethyl and the second of aluminium tributyl. The two compounds have thus smoothly exchanged their alkyl radicals according to the equation:

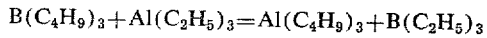

It is apparent that in the mixture of aluminium triethyl and boron tributyl, an equilibrium is reached in the exchange of alkyl radicals and that, on distillation, the equilibrium is dispatched, the component of lowest boiling point, in this case boron triethyl, being driven off first. This mutual conversion of aluminium and boron hydrocarbons in accordance with the invention therefore always takes place when a new boron compound can be formed which has a boiling point lower by comparison than those of all other reaction products which could conceivably be formed by exchange of hydrocarbon radicals. Conversely, it is of course also possible to react boron tributyl and aluminium triethyl with one another. Boron triethyl can also be converted into boron tributyl by mixing it in the cold with an excess of aluminium tributyl. In such a case it is necessary to hydrolyze the product with water.

The process of the invention constitutes a technical advance as regards the synthesis both of aluminium compounds and of boron compounds because, with the assistance of this process, a number of compounds are more readily available than hitherto, and because in addition the conversion of boron compounds into aluminium compounds and vice versa can with advantage be included in certain technically important processes.

This may be explained by a number of examples:

Aluminium cyclohexyl compounds are obtainable only with great difficulty, but boron tricyclohexyl can readily be produced, for example by adding diborane to cyclohexene. If the boron tricyclohexyl is then treated with aluminium triethyl or aluminium trimethyl, boron triethyl and boron trimethyl, respectively, can be distilled out of the mixture. A product which consists largely of aluminium tricyclohexyl is then left.

Further, it is known from the work carried out by H. C. Brown and B. C. Subba Rao: Journal of Organic Chemistry, 22, 1137/8 (1957), and by P. A. McCusker: Ang. Chem. 69, 687 (1957), that from straight-chain olefines which carry the double bond in, for example, the 2-position, it is possible to obtain the corresponding primary boron trialkyls by reaction with diborane under certain conditions. During the reaction, transposition of the initially formed secondary boron trialkyls into primary boron trialkyls takes place in accordance with the equation:

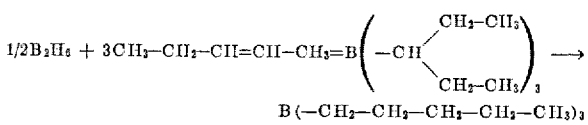

An analogous reaction for aluminium compounds has not so far become known.

By means of the radical interchange between boron and aluminium alkyls in accordance with the invention, the reaction described above can now also be applied to aluminium alkyls; in this case, low boron alkyls, such as boron triethyl or boron trimethyl, are formed as secondary products, and these can be reconverted into diborane by hydrogenation (cf. R. Koster; Ang. Chem. 69 94 (1957)).

Another application of the process according to the invention enables the simple production of pure aluminium triaryls, and more especially of pure aluminium triphenyl, from the corresponding boron compounds which are readily available. As is known, sodium borotetraphenyl is a commercial product. It is used for the detection and quantitative determination of potassium. If it is treated firstly with diethyl aluminium chloride and then with aluminium triethyl, the following two reactions occur successively:

(1) $3(C_6H_5)_4BNa + 3ClAl(C_2H_5)_2$
 $= 3NaCl + 3B(C_6H_5)_3 + Al(C_6H_5)_3 + 2Al(C_2H_5)_3$ (2) $3NaCl + 3B(C_6H_5)_3 + Al(C_6H_5)_3 + 3Al(C_2H_5)_3$
 $= 4Al(C_6H_5)_3 + 3B(C_2H_5)_3 + 3NaCl$

Boron triethyl is obtained by distillation, as well as a residue consisting of a mixture of aluminium triphenyl and common salt from which the aluminium triphenyl can very easily be recovered by extraction with the exclusion of air, for example with hot xylene.

Finally, reference is also to be made to the following possible application of the process according to the present invention: According to the process of U.S. Patent No. 2,975,215, issued March 14, 1961, boron alkyls can be built up by reaction with ethylene to form higher boron alkyls in the presence of catalytically acting quantities of aluminium alkyls. If the higher boron alkyls which are formed are mixed with an equivalent quantity of a low homologous aluminium trialkyl, for example aluminium triethyl, the entire boron content of the reaction mixture is obtained in the form of boron triethyl by distillation, and all the higher alkyl radicals built up by reaction with ethylene are then bonded to the aluminium in the form of higher aluminium alkyls. The final result of such a reaction sequence is in principle the same as if the corresponding aluminium alkyl of low molecular weight had been built up directly with ethylene to form a higher aluminium alkyl. Nevertheless, the interposition of the corresponding reaction of the boron alkyls catalysed by aluminium trialkyls can offer advantages, since this reaction can be controlled better than the direct formation of low aluminium trialkyls by ethylene, in which explosion-like decompositions of the reaction mixture occasionally occur

3 when the course of the reaction is not supervised with great care.

The following examples further illustrate the reaction:

Example 1

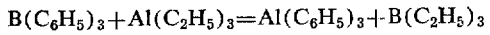
$B(C_6H_5)_3 + Al(C_2H_5)_3 = Al(C_6H_5)_3 + B(C_2H_5)_3$ 35.4 g. (0.31 mol) of aluminium triethyl are slowly introduced dropwise into 70 g. (0.288 mol) of solid boron triphenyl (M.P.=147/8° C.; prepared for example from sodium borotetraphenyl and boron fluoride etherate in xylene). The said boron triphenyl being in a nitrogen atmosphere in a 250 cc. 3-necked flask (dropping funnel, stirrer device, small column with a connected reflux condenser and a receiver cooled to −80° C.), the introduction being effected while stirring well. The mixture heats up; it is thereafter heated slowly under reduced pressure to a maximum of about 140° C.; a homogeneous liquid is thereby formed (at about 80° C.). The boron triethyl distills into the cooled receiver (after about 2 hours, 25 g. of boron triethyl, corresponding to 87% of the theoretical has distilled over). Crude aluminium triphenyl, which solidifies on cooling, is recovered as residue. This is recrystallised from a 2:1 hexane-benzene mixture under nitrogen. 61.4 g. (82.5% of the theoretical) of the pure substance (M.P.=198–200° C.) are obtained.

Example 2

$B(CH_2C_6H_5)_3 + Al(C_2H_5)_3 = Al(CH_2C_6H_5)_3 + B(C_2H_5)_3$

Altogether 40 g. (98.5% of the theoretical) of boron triethyl is obtained as distillate from 117 g. (0.412 mol) of boron tribenzyl and 49 g. (0.417 mol) of aluminium triethyl after mixing (without strong heat of reaction) and distillation of the thoroughly stirred reaction mixture at reduced pressure (maximum temperature 90° C.). The residue is a highly viscous liquid (125.9 g.) and consists of crude aluminium tribenzyl, which completely solidifies after standing for a relatively long period. The product is recrystallised from a xylene-cyclohexane mixture (1:2) with exclusion of air. Colourless crystals with a melting point of 118° C. and an aluminium content of 9.2% (calculated for aluminium tribenzyl: 9.0% Al) are obtained.

Example 3

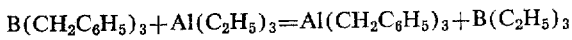
$B(\alpha\text{-}C_{10}H_7)_3 + Al(C_2H)_3 = Al(\alpha\text{-}C_{10}H_7)_3 + B(C_2H_5)_3$ 64.5 g. (0.547 mol) of aluminium triethyl are added to a suspension of 207 g. (0.527 mol) of boron tri-α-naphthyl in about 200 cc. of methyl naphthalene in a nitrogen atmosphere and while stirring thoroughly.

The mixture is slowly heated under reduced pressure (10 mm. Hg.) to about 110–115° C.; the boron triethyl which is formed is distilled off with some solvent. 45.6 g. (88.1% of the theoretical) of boron triethyl are obtained in the distillate and a solid mass remains as a residue in the reaction vessel on cooling. The residual solvent is distilled off therefrom under greatly reduced pressure (0.1 mm. Hg). Thereafter, the crude aluminium tri-α-naphthyl is recrystallized from a 1:1 mixture of toluene and xylene, washed several times with pentane, and dried. A colourless loose crystalline powder with a melting point of 212° C.; is obtained; the yield of pure aluminium tri-α-naphthyl is 80% of the theoretical.

Example 4

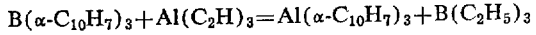
$B(n\text{-}C_4H_9)_3 + Al(CH_3)_3 = Al(n\text{-}C_4H_9)_3 + B(CH_3)_3$ A mixture of 20.5 g. (0.284 mol) of aluminium trimethyl and 52 g. of 0.285 mol of boron tri-n-butyl is heated under reduced pressure to a maximum of 200° C., 13.5 g. (85% of the theoretical) of boron trimethyl being condensed over a period of about 3 hours in a receiver cooled with liquid air. The residue which is left consists of a mixture of aluminium tri-n-butyl and aluminium di-n-butyl hydride, from which pure aluminium tri-n-butyl can be recovered in known manner with the aid of n-butene.

Example 5

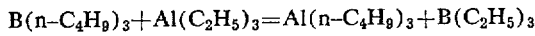
$B(n\text{-}C_4H_9)_3 + Al(C_2H_5)_3 = Al(n\text{-}C_4H_9)_3 + B(C_2H_5)_3$ 76.6 g. (0.42 mol) of boron tri-n-butyl are mixed in a nitrogen atmosphere with 48 g. (0.42 mol) of aluminium triethyl. The mixture is heated under reduced pressure (about 12 mm. Hg) for 4–5 hours, the heating taking place slowly to a maximum of 200° C., whereby altogether 35 g. (85% of the theoretical) of boron triethyl are condensed in a cooled receiver. An aluminium tri-n-butyl which initially is still contaminated with a small quantity of boron tri-n-butyl is obtained as residue. The residue is distilled under greatly reduced pressure (about 0.1 mm. Hg), two fractions being obtained; the first consists of small quantities of boron compounds (in part mixed boron trialkyls), and the second consists of the aluminium tri-n-butyl which is formed (B.P. 10–4 mm. Hg=82° C.).

Example 6

$B(C_{10}H_{21})_3 + Al(C_2H_5)_3 = B(C_2H_5)_3 + Al(C_{10}H_{21})_3$ 87 g. (0.2 mol) of boron tri-n-decyl and 23 g. (0.2 mol) of aluminium triethyl are mixed and thereafter heated under reduced pressure (0.1 to 1 mm. Hg) to a maximum of 140° C. 17.5 g. (90% of the theoretical) of boron thiethyl distil into the cooled receiver; 430 g. of aluminium didecyl hydride, are obtained as residue. The yield is practically quantitative.

Example 7

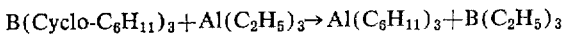
$B(\text{Cyclo-}C_6H_{11})_3 + Al(C_2H_5)_3 \rightarrow Al(C_6H_{11})_3 + B(C_2H_5)_3$ 61.5 g. (0.236 mol) of boron tricyclohexyl and 27.5 g. (0.24 mol) of aluminium triethyl are heated under nitrogen in 200 cc. of perhydrocumene to a temperature of 80 to 100° C. The boron triethyl which is formed (22.6 g.) is thereafter distilled off under reduced pressure, together with the solvent. After cooling the residue, an aluminium tricyclohexyl which solidifies as colourless crystals and which still contains only small quantities of ethyl and hydride fractions is obtained. The yield is substantially quantitative.

Example 8

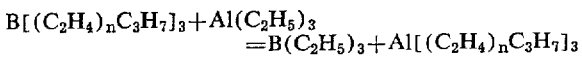
$B[(C_2H_4)_nC_3H_7]_3 + Al(C_2H_5)_3$
$= B(C_2H_5)_3 + Al[(C_2H_4)_nC_3H_7]_3$ 150 g. of a mixture of higher boron trialkyls with a boron content of 3.5% B (average molecular weight about) are mixed under nitrogen with 60 g. (0.5 mol) of aluminium triethyl. While stirring well, the mixture is heated under reduced pressure for 4 hours at about 70° C. In this way, altogether 46 g. (95% of the theoretical) of boron triethyl are obtained in a distillate which is free from aluminium. The residue (free from boron) contains 9.0% of aluminium and consists of a mixture of higher aluminium trialkyls together with a small quantity of α-olefines.

Example 9

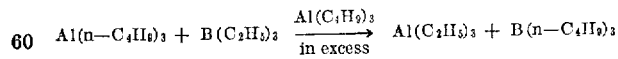
$Al(n\text{-}C_4H_9)_3 + B(C_2H_5)_3 \xrightarrow[\text{in excess}]{Al(C_2H_9)_3} Al(C_2H_5)_3 + B(n\text{-}C_4H_9)_3$ 198 g. (1 mol) of aluminium tri-n-butyl and 24.5 g. (0.25 mol) of boron triethyl are mixed in a 500 cc. flask with the exclusion of air. Exchange of the alkyl groups occurs immediately it being possible to established this by decomposition of a sample of the mixture with the aid of water or alcohol in the cold. After adding 200 cc. of dry pentane, the aluminium trialkyls present are completely decomposed while cooling and with the addition of 120 cc. of water to form aluminium hydroxide and hydrocarbons (ethane and n-butane). The pentane layer is thereafter separated with the boron tri-n-butyl which is formed; after drying and distilling off the solvent, altogether 45 g. (85% of the theoretical) of boron tri-n-butyl with a B.P. mm. Hg=67° C., are obtained.

Example 10

Preparation of aluminium triphenyl from sodium borotetraphenyl: 68.4 g. (0.2 mol) of sodium borotetraphenyl and 24.8 g. (0.2 mol) of aluminium diethyl monochloride are dissolved in 150 cc. of xylene. The mixture is heated for 5–6 hours while stirring and under reflux. Common salt is precipitated and the reaction mixture is filtered off therefrom. The deposit is washed with warm benzene and the combined filtrates are thereafter substantially freed from the solvents by distillation. After adding 7.7 g. (0.067 mol) of aluminium triethyl, the boron triethyl formed is distilled off together with the residual solvent. The residue, which is initially still oily, crystallises after being dissolved in hot xylene and thereafter cooling. 30 g. (42.2% of the theoretical) of aluminium triphenyl with a melting point of 195–198° C. are obtained.

What I claim is:

1. Process for exchanging hydrocarbon groups between aluminium hydrocarbon compounds and boron hydrocarbon compounds which comprises reacting, in the absence of a catalyst, a boron hydrocarbon compound with an aluminium hydrocarbon compound the hydrocarbon radicals of which are different.

2. Process as claimed in claim 1, of the production of low boron hydrocarbons, wherein a higher boron hydrocarbon compound is reacted with an aluminium hydrocarbon compound the hydrocarbon radicals of which have a lower molecular weight than those of the boron compound, and the mixture is distilled.

3. Process as claimed in claim 1 for the production of higher boron hydrocarbons, wherein a low boron hydrocarbon compound is reacted in the cold with an excess of an aluminium hydrocarbon compound the hydrocarbon radicals of which have a higher molecular weight than those of the boron compound, and the mixture is hydrolyzed.

4. Process as claimed in claim 3, wherein the mixture of reaction products is hydrolyzed with water.

5. Process as claimed in claim 1, wherein boron tricyclohexyl is reacted with aluminium triethyl to form aluminium tricyclohexyl.

6. Process as claimed in claim 1, wherein boron tricyclohexyl is reacted with aluminium trimethyl to form aluminium tricyclohexyl.

7. Process as claimed in claim 1, wherein boron triphenyl is treated with aluminium triethyl and the boron triethyl formed is distilled from the reaction mixture.

8. Process as claimed in claim 7, wherein aluminium triphenyl is extracted from the reaction mixture, in the absence of air, after distilling off the boron triethyl.

9. Process as claimed in claim 8, wherein the aluminium triphenyl is extracted with hot xylene.

10. Process as claimed in claim 1, wherein the reaction product of sodium borotetraphenyl and diethyl aluminium chloride is treated with aluminium triethyl and the resulting boron triethyl is distilled off from the reaction mixture.

11. Process as claimed in claim 10, wherein aluminium triphenyl is extracted from its mixture with sodium chloride in the residue, in the absence of air, after distilling off the boron triethyl.

12. Process as claimed in claim 11, wherein the aluminium triphenyl is extracted with hot xylene.

13. Process as claimed in claim 1, wherein a higher boron alkyl is mixed with an equivalent quantity of low homologous aluminium trialkyl and a low boron trialkyl obtained by distillation as well as a higher aluminium alkyl.

14. Process as claimed in claim 13, wherein the low aluminium trialkyl is aluminium triethyl.

15. A process which comprises reacting a straight-chain non-alpha olefin with diborane to thereby form a boron trialkyl and thereafter reacting said boron trialkyl with an aluminium hydrocarbon having a hydrocarbon radical which is different from the hydrocarbon radical of said boron trialkyl to thereby exchange hydrocarbon groups between the aluminium hydrocrabon and the boron trialkyl.

16. Process according to claim 15 wherein the boron hydrocarbon formed as an incident to the exchange is reconverted to diborane by hydrogenation.

References Cited in the file of this patent

UNITED STATES PATENTS

| | | |
|---|---|---|
| 2,247,821 | Ruthruff | July 1, 1941 |
| 2,853,526 | Perrine | Sept. 23, 1958 |

OTHER REFERENCES

Rochow: "The Chemistry of Organometallic Compounds" (1957), pp. 6 to 24, 56, 57, 126, 127, 132 and 134.

UNITED STATES PATENT OFFICE
CERTIFICATE OF CORRECTION

Patent No. 3,087,953                 April 30, 1963

Roland Köster

It is hereby certified that error appears in the above numbered patent requiring correction and that the said Letters Patent should read as corrected below.

Column 3, line 44, for "$B(\alpha-C_{10}H_7)_3 + Al(C_2H)_3 = Al(\alpha-C_{10}H_7)_3 + B(C_2H_5)_3$" read -- $B(\alpha-C_{10}H_7)_3 + Al(C_2H_5)_3 = Al(\alpha-C_{10}H_7)_3 + B(C_2H_5)_3$ --; column 4, line 26, for "thiethyl" read -- triethyl --; line 26, after "430 g. of" insert -- aluminium tri-n-decyl, which is contaminated with some --; same column 4, line 65, for "established" read -- establish --; column 6, line 32, for "hydrocrabon" read -- hydrocarbon --.

Signed and sealed this 24th day of December 1963.

(SEAL)
Attest:
ERNEST W. SWIDER

Attesting Officer

EDWIN L. REYNOLDS

Acting Commissioner of Patents